June 23, 1970  W. B. BROWN  3,516,157
METHODS OF AND APPARATUS FOR ASSEMBLING TERMINAL STRIPS
Filed Sept. 8, 1967  6 Sheets-Sheet 1
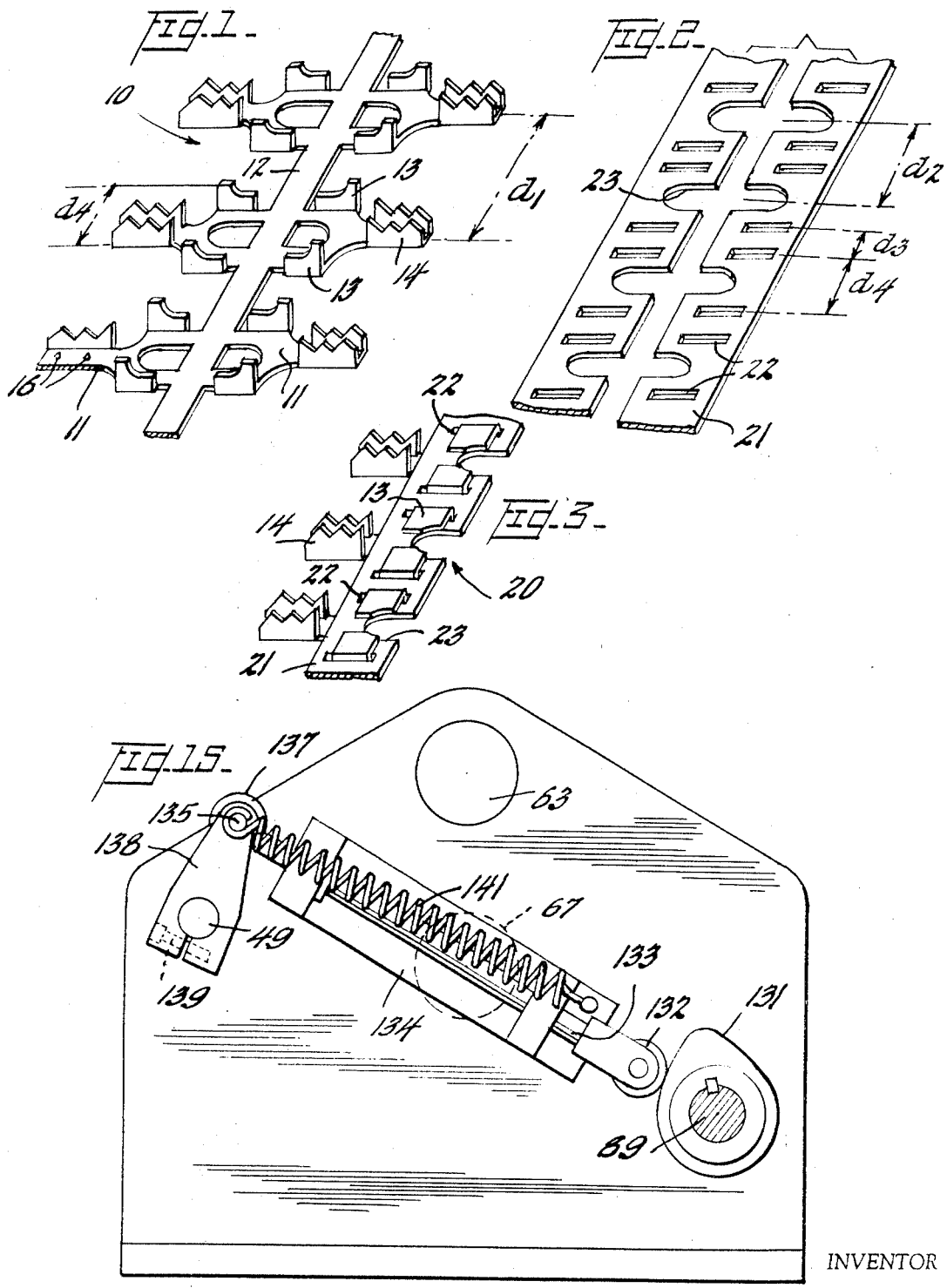
INVENTOR
W. B. Brown
BY R. P. Miller
ATTORNEY

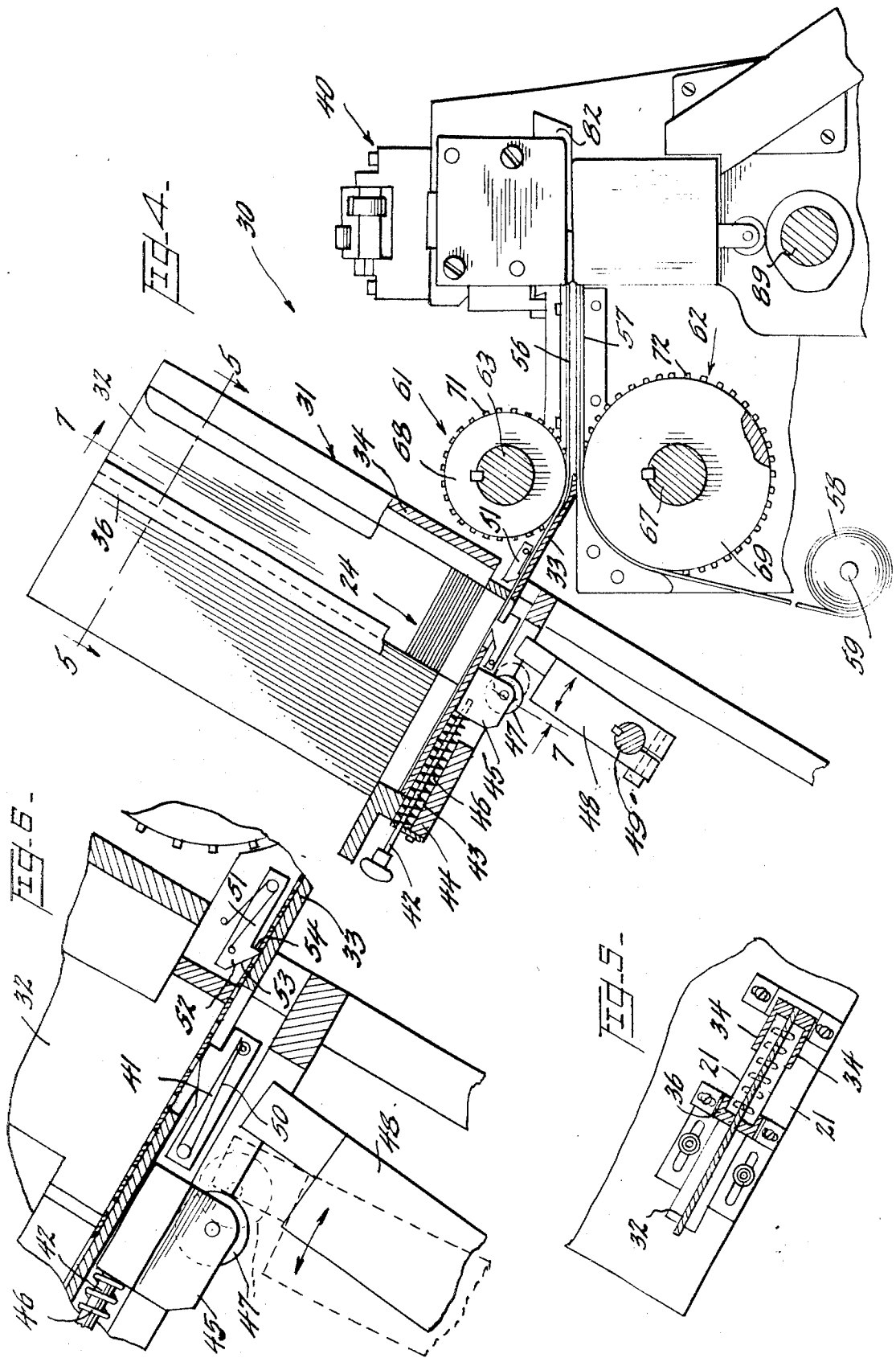

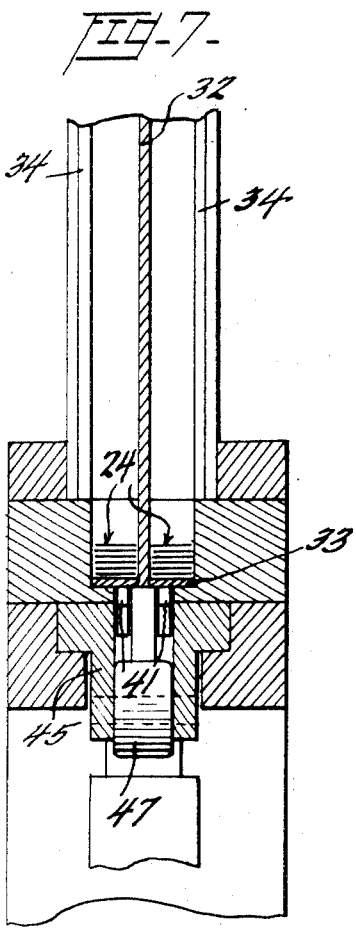
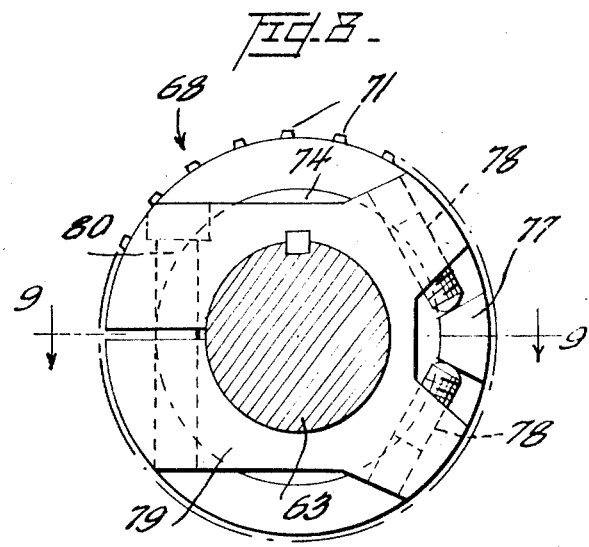
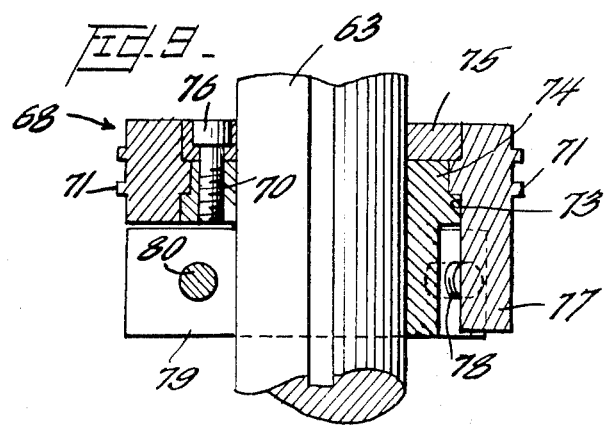
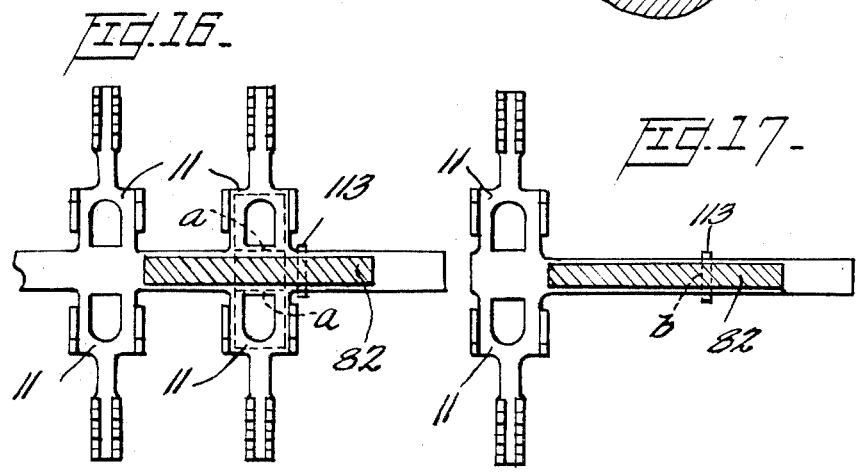

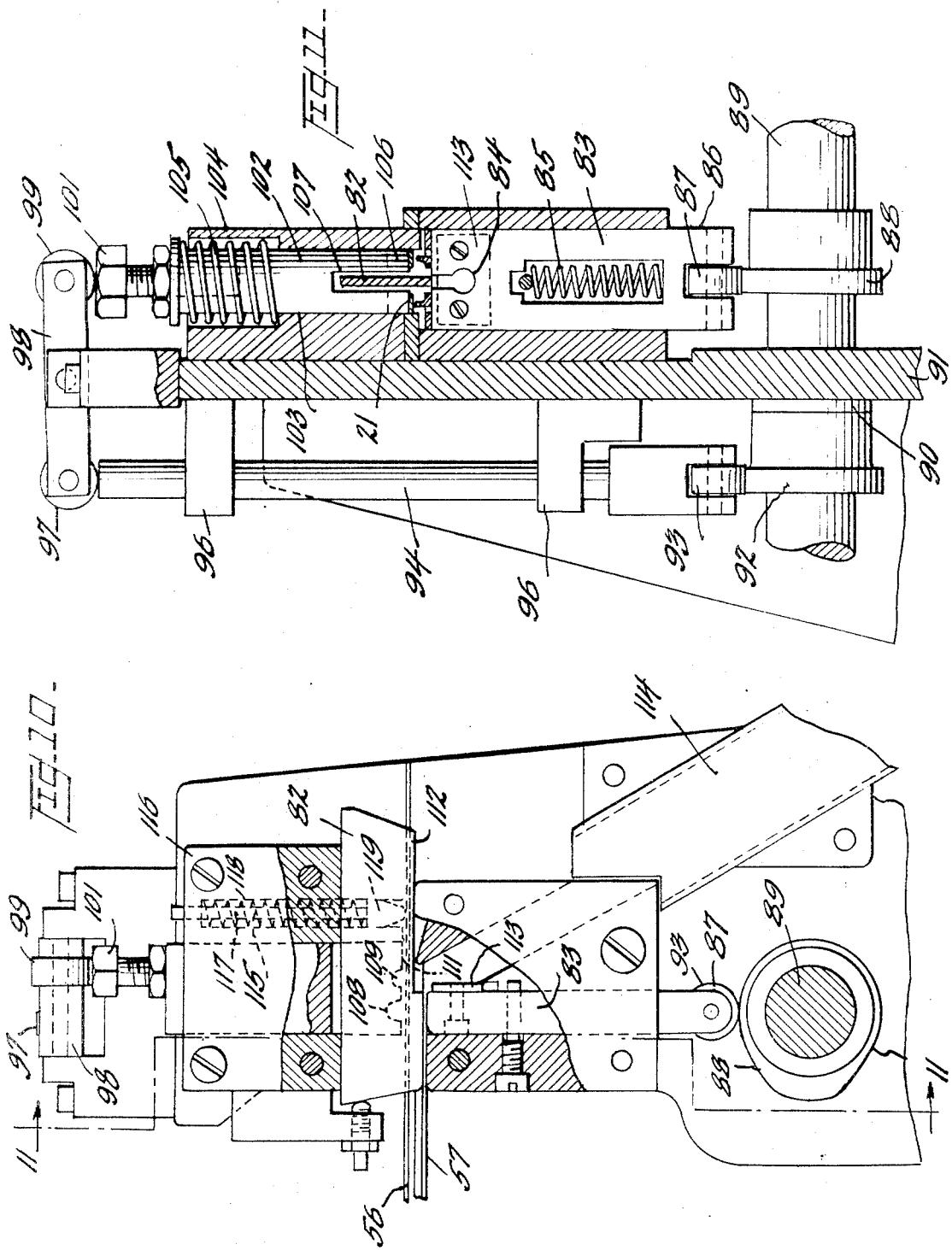

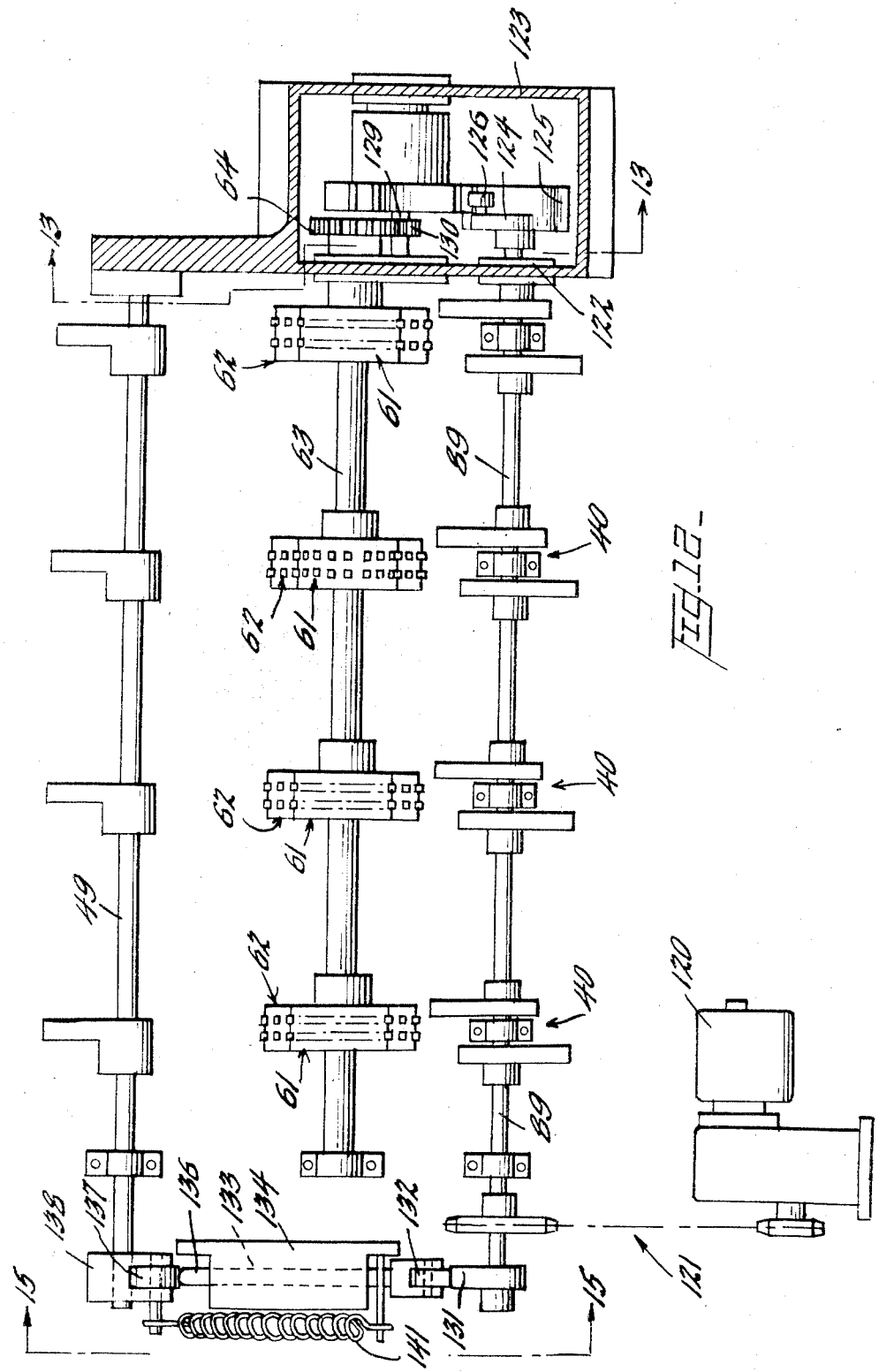

United States Patent Office

3,516,157
Patented June 23, 1970

3,516,157
METHODS OF AND APPARATUS FOR ASSEMBLING TERMINAL STRIPS
William B. Brown, Pasadena, Md., assignor to Western Electric Company, Incorporated, New York, N.Y., a corporation of New York
Filed Sept. 8, 1967, Ser. No. 668,288
Int. Cl. H05k 3/30
U.S. Cl. 29—626            21 Claims

ABSTRACT OF THE DISCLOSURE

Methods of and apparatus for feeding a supply of interconnected, uniformly spaced terminals to an advancing terminal board having a plurality of uniformly spaced sets of slots, which sets are spaced at a different spacing interval than the spacing of the terminals, and for removing successive leading terminals from the strip of terminals and inserting legs projecting from each of the leading terminals into an associated set of the slots in the terminal board. This permits the use of the same progressive punch and die to provide a continuous supply of interconnected terminals for assembly with many different types of boards of electrical insulating material having slots formed therein with spacing which differs for different types of boards.

BACKGROUND OF THE INVENTION

Field of the invention

This invention relates to methods of and apparatus for feeding a series of uniformly spaced first members to uniformly spaced positions associated with a second member wherein the serial spacing between successive first members being fed to the second member are different than the spacing of the associated portion of the second member.

Description of the prior art

In the past, the assembly of metal terminals with terminal boards made of an insulating material, such as laminated vinyl material, to permit a plurality of properly spaced terminals to be inserted simultaneously into electrical equipment around a plurality of similarly spaced screw or binding posts, has generally been accomplished in an operation involving a considerable amount of manual labor. The metal terminals are usually formed in a progressive punch and die machine so that the terminals have a uniform spacing between each other and are connected integrally in a continuous metal strip.

Successive leading terminals from a number of strips of metal terminals, equal to the number of terminals to be inserted in each type of terminal board, are fed simultaneously into an assembly apparatus having a set of punches and dies. The strips of metal terminals are fed transversely of the terminal boards. Each terminal in each of the strips of terminals has two upwardly projecting legs and punches and dies sever the leading terminal from an associated strip of terminals. The projecting legs on each of the severed terminals are inserted simultaneously into associated slots in the terminal board, and the terminals are secured to the board by bending the legs of the terminals transversely of the slots so that the ends of the legs are parallel to and in engagement with the adjacent surface of the board.

When it is desired to assemble a series of different types of terminal strips on which the inserted terminals are to have a predetermined spacing different from that of a preceding board, it is necessary to adjust the spacing of the set of punches and dies. This is a very time consuming operation and, of course, the previously described assembly operation still involves the step of positioning the terminal boards manually into the assembly apparatus.

In order to mechanize the operation, a different progressive punch and die generally has been utilized to change the spacing between a group of interconnected terminals whenever a different type terminal board having different spacings between the slots in the board into which the legs of the terminals are inserted is to be used. Then the group of terminals, connected together in a strip, could be advanced into longitudinal alignment over a terminal board whereupon all of the terminals could be severed simultaneously from each other and inserted simultaneously into a particular terminal board.

This, of course, would be most expensive in that additional sets of punches and dies would have to be made available for each combination of spacings, thereupon occupying valuable work or storage space. Alternatively, as discussed hereinbefore, a time consuming adjustment of the punch and die sets would have to be effected to vary the position of the parts of the set of punches and dies.

There is a need for a single apparatus which is capable of feeding terminals from a single supply of uniformly spaced, interconnected terminals, and for severing successive leading terminals and inserting legs projecting from the terminals into various types of insulating terminal boards having different spacings between sets of slotted openings formed therein which are to receive the legs of the terminals.

SUMMARY OF THE INVENTION

It is therefore an object of the present invention to provide methods of and apparatus for feeding a series of uniformly spaced first members to uniformly spaced portions associated with a second member wherein the serial spacing between successive first members being fed to the second member are different than the spacing of the associated portion of the second member.

It is also an object of the invention to provide a new and improved method and apparatus for assembling terminal strips.

It is an additional object of the invention to provide an apparatus for assembling terminals to terminal boards which may be changed readily to permit the use of a single integral strip of uniformly spaced terminals and permit the terminals to be assembled automatically in the terminal boards with a different preselected spacing.

It is another object of this invention to feed successive terminals in a single integral strip of interconnected, uniformly spaced terminals, and to align each successive leading terminal in the strip with a pair of slots in a terminal board so that the leading terminal may be severed from the strip and assembled to the board, at a different spacing than the spacing of the terminals in the integral strip of terminals, and thereafter assembled to the board.

It is a further object of this invention to provide a terminal board feeding device which cooperates with a terminal feeding device to position successive terminals in an integral strip of interconnected terminals, having an initial spacing distance between terminals, adjacent to a terminal board so that the successive leading terminals can be severed from the strip and secured to the board a second spacing distance wherein the ratio of the first spacing distance to the second spacing distance is equivalent to the ratio of feeding parameters of the terminal feeding device to the terminal board feeding device.

It is an additional object of this invention to provide an apparatus having a pair of selectively proportioned rotary feed devices for inserting projecting legs of terminals from an interconnected strip of terminals having a constant first space between the terminals, into slots in a terminal board, in which the slots are formed successively along the board with a second space therebetween, wherein the ratio of feeding distances for the rotary devices is proportional to the ratio of the first space to the second space.

A method illustrating certain features of the present invention may include the feeding of a series of uniformly spaced first members to uniformly spaced positions associated with a second member wherein the serial spacing between successive first members being fed to the second member are different than the spacing of the associated positions of the second member. More particularly, a leading terminal of a strip of interconnected terminals, each of the terminals having projecting legs, is assembled to a terminal board by inserting the projecting legs into a pair of slots in the board. The spacing between the centers of adjacent terminals in the strip of interconnected terminals is different from the spacing between the centers of each pair of slots. The strip of interconnected terminals and the terminal boards are fed at rates, the ratio between which is proportioned to the ratio of the distance between the centers of adjacent terminals and the distance between the pairs of slots.

Apparatus illustrating certain features of the invention may include a first feed device which cooperates with a second feed device for feeding a strip of terminals having a first space between successive terminals and for separating the terminals from the strip and assembling the terminals to terminal board with the terminals, when assembled to the terminal board, having a second space therebetween. The feed devices are selected so that the ratio of feeding distances of the feed devices is equal to the ratio of the first space to the second space.

More particularly, this invention includes methods of and apparatus for manufacturing a terminal strip by assembling terminals, which are interconnected in a strip at a uniform spacing, with a terminal board having a plurality of sets of slots spaced at predetermined distances along the board. The spacing between the sets of slots in the terminal board may vary for different type terminal strips and differs from the spacing between the interconnected terminals.

In order to assemble the terminals with the terminal board, a pair of rotary feed sprocket wheels, having spaced parallel axes of rotation, is provided. The ratio of the diameters of the feed wheels is chosen to be equal to the ratio of the center to center spacing between adjacent terminals in the strip of interconnected terminals to the center to center spacing between adjacent sets of slots in the terminal board.

The strip of interconnected terminals and the terminal board are interposed between the feed wheels and are advanced to an insertion and bending station where successive terminals are aligned with successive slots in the terminal board whereupon the leading terminal of the strip is severed from the strip as the legs on the terminal are inserted into slots in the terminal board and are subsequently bent over into engagement with the terminal board. By selectively proportioning the diameters of the feed wheels, the relative movement between terminal board and the strip of interconnected terminals is such that a leading terminal will always be aligned with a pair of slots at the insertion and bending station.

Other objects and advantages of the present invention will be apparent upon consideration of the following detailed description when considered in conjunction with the accompanying drawing, wherein:

BRIEF DESCRIPTION OF THE DRAWING

FIG. 1 is a perspective view of a strip of interconnected pairs of metal terminals having legs and ferrule portions upstanding therefrom;

FIG. 2 is a perspective view of a pair of terminal boards which are used to assemble the terminals from the strip of interconnected terminals illustrated in FIG. 1;

FIG. 3 is a perspective view of an assembled terminal strip showing a plurality of metal terminals having the formerly upstanding legs thereof inserted into slots in the terminal boards and bent thereagainst;

FIG. 4 is a side elevational view, partially in section, of the apparatus embodying certain principles of the present invention and showing a supply magazine, feeding devices and an insertion, bending and severing station;

FIG. 5 is a sectional view of the magazine shown in FIG. 4 and taken along lines 5—5 thereof;

FIG. 6 is an enlarged view of a lower portion of the supply magazine of FIG. 4 illustrating details of a mechanism for maintaining pressure on successive terminal boards;

FIG. 7 is an enlarged, sectional view of the apparatus of FIG. 4 taken along lines 7—7 thereof;

FIG. 8 is an enlarged, elevational view, partially in section, showing details of one of the feeding devices of the apparatus of FIG. 4;

FIG. 9 is a horizontal section of the feeding device shown in FIG. 8 taken along lines 9—9 thereof to illustrate the details for adjustment of a wheel with respect to a drive shaft;

FIG. 10 is an enlarged, elevational view, partially in section, of the inserting and bending and severing station of the apparatus of FIG. 4;

FIG. 11 is a side elevational view of the work station shown in FIG. 10;

FIG. 12 is a schematic view of a drive train for the apparatus of FIG. 4;

FIG. 15 is an enlarged, side, elevational view of the apparatus of FIG. 12 taken along lines 15—15 thereof to show details of the mechanism for actuating a shaft which cooperates with the supply magazine to drop successive terminal boards onto a feed track;

FIG. 16 is a detail, top, plan view of a leading pair and succeeding pair of terminals in position in the work station of the apparatus of FIG. 4 with top and bottom punches superimposed thereon to indicate the lines along which the terminals are to be severed from the strip; and FIG. 17 is a detail view of the succeeding pair of ternals shown in FIG. 16 at a subsequent instant of time after the leading pair of terminals, shown in FIG. 16 have been severed from the strip and prior to the strip being moved in preparation for a subsequent operation.

DETAILED DESCRIPTION

Figure 13:
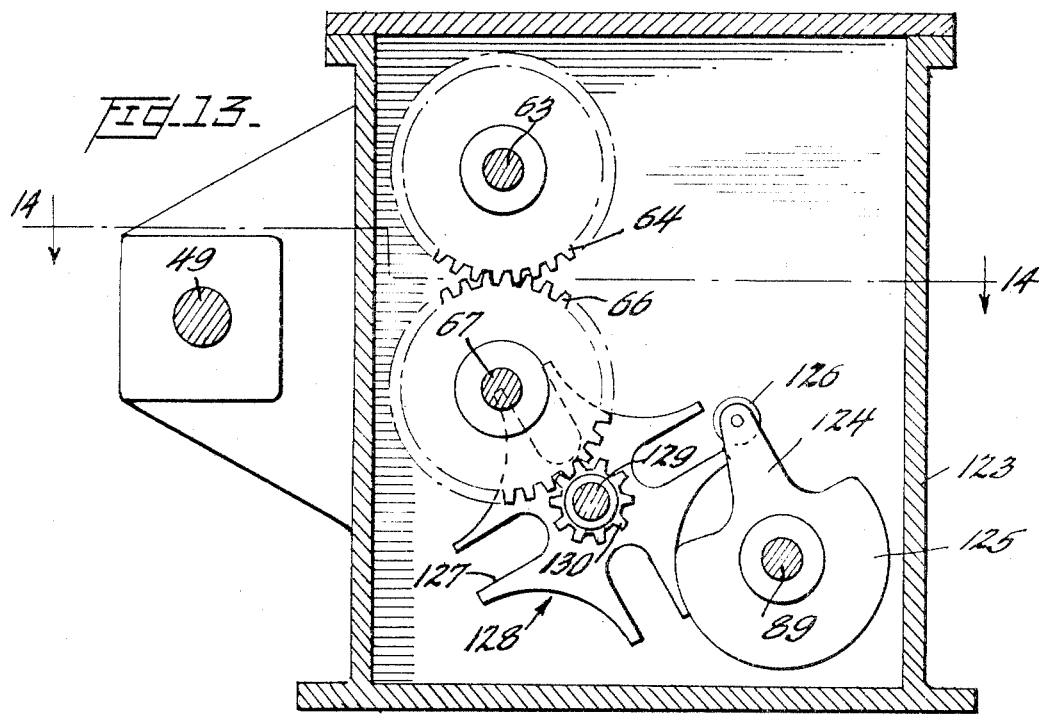
FIG. 13 is an enlarged, vertical, sectional view of a gear box shown in FIG. 12 and taken along lines 13—13 thereof.

Referring now to FIG. 1, there is shown a strip, designated generally by the numeral 10, of interconnected terminals, designated generally by the numerals 11—11. The strip 10 may be formed from a strip of tin-plated brass, or other suitable material, by a progressive punching process and has a solid, continuous center portion 12 with pairs of the terminals 11—11 extending transversely from the center solid portion on opposite sides of the strip. Each of the terminals 11—11 has a pair of upstanding legs 13—13 and a ferrule 14. Each of the ferrules 14—14 has a pair of prongs 16—16 projecting from a concave portion thereof, and are used to pierce the insulation of an electrical conductor that is placed in the ferrule 14 to establish electrical contact therewith.

The strip 10 of interconnected terminals 11—11 is cut out in a progressive punch and die (not shown) with a uniform distance $d_1$ between the centers of successive pairs of opposing terminals (see FIG. 1), and then the upstanding legs 13—13 and the ferrules 14—14 are formed.

Referring now to FIG. 3, there is shown an assembled terminal strip, designated generally by the numeral 20, which includes a terminal board 21 (see FIG. 2) made from a laminated vinyl, or other suitable material, and having a plurality of spaced slots 22—22 formed therein. The slots 22—22 are arranged in pairs to receive the legs 13—13 of the terminals 11—11 with a spacing of a distance $d_4$ between centers of the slots of each pair of slots being equal to the space between the centers of the upstanding legs of the terminals. The board 21 is formed with a cutout portion, or notch, 23 between the slots 22—22 of each pair of the slots. These notches 23—23 are positioned centrally between the slots 22—22 of each pair of the slots, and are spaced at a distance $d_2$.

The required distance between adjacent terminals 11—11 in the terminal strip 20 may be different in one application than in another. Each of the terminal strips 20—20 in which the distance $d_2$ between the centers of adjacent cutout portions 23—23 is a fixed value and a corresponding fixed distance $d_3$ between the centers of the adjacent slots 22—22 in adjacent pairs of slots (see FIG. 2) are referred to as a particular type of terminal strip. The slots 22—22 of each pair of slots are separated by the distance $d_4$ and this distance remains constant in all of the types of terminal strips 20—20. The upstanding legs 13—13 of each terminal 11 are also separated by the distance $d_4$ (see FIG. 1) to permit insertion of the legs 13—13 through the slots 22—22.

As mentioned hereinbefore, one solution to the problem of automatically assembling the terminals 11—11 in the strip 10 to the various types of boards 21—21 is to use a different progressive punch and die for forming the strip 10 with the distance $d_1$ between the centers of the successive terminals which is exactly equal to the desired distance $d_2$ between the centers of the pairs of the slots 22—22 in the board. The assembly operation can be more economically performed if the continuous strip 10 of the terminals 11—11, having the uniform spacings $d_1$—$d_1$, are formed and used in conjunction with any type of the boards 21—21 having any predetermined, uniform distance $d_2$ between the recurring pairs of the slots 22—22.

An apparatus, designated generally by the numeral 30, for assembling the strip 10 of the interconnected, uniformly spaced terminals 11—11 to any type of terminal boards 21—21, having any predetermined, uniform spacing between successive pairs of the slots 22—22 is shown in FIG. 4. Plural stacks, designated generally by the numerals 24—24, of the terminal boards 21—21 which have been formed in a previous operation are placed in a supply magazine, designated generally by the numeral 31 (see FIG. 4). The magazine 31 has a center plate 32 which is attached to a feed track 33. A pair of front guide plates 34—34 (see FIG. 5) are mounted adjustably with respect to the center plate 32 so that the front plates may be moved outwardly away from the center plate for different width terminal boards 21—21. A rear guide plate 36 is positioned on each side of the center plate 32 at a sufficient distance from the associated front plate 34 to receive a specific length terminal board 21. Furthermore, the rear guide plates 36—36 may be moved adjustably and secured, further from, or closer to, the front plates 34—34 to receive different types of terminal boards 21—21.

As may be seen in FIGS. 5 and 7, the arrangement of the magazine 31 with duplicate guide plates 34—34 and 36—36 on opposite sides of the common center plate 32 permits the employment of two supply stacks 24—24 of the terminal boards 21—21. In this way, full advantage is taken of the opposing terminals 11—11 on each side of the center portion 12 of the strip 10, in that each of the opposing terminals may be severed from the strip and the legs 13—13 thereof simultaneously inserted and bent into engagement with the associated terminal board 21. Moreover, by adjusting selectively the rear guide plates 36—36, the magazine will accommodate terminal boards 21—21 in one of the stacks 24—24 which are of a different length than the terminal boards 21—21 in the other stack.

In order to bias the terminal boards 21—21 forwardly toward an assembly device, designated generally by the numeral 40, a feed pawl 41 engages one of the cutout portions 23—23 (FIG. 2) of the lowermost terminal board 21 of each supply stack 24 which is in contact with the feed track 33 (see FIGS. 4, 6 and 7). Each of the feed pawls 41—41 is attached pivotally to one end of a reciprocably mounted carriage 45. The other end of the reciprocably mounted carriage 45 is attached to a reciprocably mounted plunger 42 which is positioned in a bore 43 of a block 44 that is attached fixedly to the underside of the feed track 33.

A compression spring 46 is disposed concentrically about the plunger 42 to bias the plunger, the carriage 45, and the pawl 41 so that the pawl maintains a force against the bottom board 21 in the magazine 31. In this way, when the plunger 42 is released, the terminal boards 21—21 are pushed against the preceding terminal board and maintains the boards in engagement with each other as the boards pass through the remainder of the apparatus 30.

A roller 47 is mounted on a depending portion of the carriage 45 adjacent to a notched upper end of an oscillatable arm (see FIG. 7). The arm 48 is keyed to a shaft 49 (FIG. 4) and is oscillated positively by oscillation of the shaft. When roller 47 is in contact with the arm 48, the arm is moved counterclockwise against the roller, and the carriage 45 is moved rearwardly to move pivotally the pawl 41 in a clockwise direction as viewed in FIG. 6. A hairpin spring 50 is attached to the pawl 41 to bias the pawl in a counterclockwise direction against the board 21. The feed pawl 41 disengages one of the cutout portions 23—23 in the terminal board 21 and rides under the terminal board until the pawl engages the next successive cutout portion 23 of the same terminal board, or the adjacent cutout portion of the next successive board in the supply magazine 31. The pawl 41 is then urged pivotally in a counterclockwise direction by the spring 50 into registration with the cutout portion 23.

After the driving motion of the shaft 49 in a counterclockwise direction, as viewed in FIG. 4, has been discontinued, the arm 48 is moved in a clockwise direction out of contact with the roller 47, the spring 46 exerts a force against the plunger 42, and the plunger maintains pressure through the feed pawl 41 on the boards 21—21. At this time, the arm 48 has moved out of engagement with the roller 47, and the arm and roller occupy the approximate relative full line positions shown in FIG. 4. Meanwhile the boards 21—21 are indexed forwardly toward the assembly device 40 which tends to relieve the pressure of each board against adjacent boards on the guide track 33. As the boards 21—21 are indexed forwardly, the carriage 45 is biased forwardly by the plunger 42 to move the roller 47 into reengagement with the arm 48, whereafter the arm is oscillated through another cycle.

In addition, a retaining, or antiretrograde, dog 51 is mounted pivotally above the feed track 33 forward of the front guide plates 34—34. The dog 51 has a tooth 52 formed along a bottom edge thereof. The tooth 52 is formed with a sloping edge 53 and with an edge 54 normal to the feed track 33. In this way, as the terminal boards 21—21 are fed in a forward direction, the boards engage the sloping edge 53 to raise the dog 51 out of the then active cutout portion 23 and the tooth 52 will drop into the next successive cutout portion of the terminal board when the next cutout portion is moved under the tooth. The edge 54 prevents the terminal board 21 from backing up toward the supply magazine 31 when pressure applied to the terminal board by the spring 46 through the pawl 41 is released.

The feed track 33, which is sloped with respect to the horizontal under the supply magazine 31, transitions into a horizontal, upper guide track 56 onto which the terminal boards 21—21 are fed (see FIG. 4). A lower guide track 57 is adjacent the upper guide track 56 and receives the strip 10 of terminals 11—11 from a supply roll 58 mounted on a spindle 59. The terminal boards 21—21 and the strip 10 of terminals 11—11 are advanced simultaneously along the upper guide track 56 and lower guide track 57, respectively, between a first rotary feed drive, designated generally by the numeral 61, and a second rotary feed device, designated generally by the numeral 62.

The feed devices 61 and 62 have parallel axes of rotation which are spaced apart a sufficient distance to allow passage of the terminal boards 21—21 and strip 10 of terminals 11—11 therebetween. The first rotary feed device 61 is mounted on a shaft 63 which is keyed to a gear 64 (see FIGS. 12 and 13). The gear 64 meshes with a gear 66 that is keyed to a shaft 67 on which is mounted the second feed device 62 (see FIG. 13).

The feed devices 61 and 62 include annular sprocket wheels 68 and 69, respectively (see FIG. 4). The sprocket wheel 68 has a double row of the teeth 71—71 formed along the outer periphery thereof to engage the cutout portions 23—23 of a double row of the terminal boards 21—21 (see FIG. 9). Similarly, the sprocket wheel 69 has a double row of teeth 72—72 formed along the outer periphery thereof to engage each strip 10 between the center portion 12 and the terminals 11—11. In a preferred embodiment, the number of teeth 71—71 on the sprocket wheel 68 is equal to the number of the teeth 72—72 on the sprocket wheel 69. Furthermore, in the preferred embodiment, the gears 64 and 66 are identical so that the shafts 63 and 67 are rotated at the same speed.

As can be seen in FIG. 4, the feed track 33 makes an oblique angle with the guide tracks 56. The apparatus is arranged in this configuration so that when one of the terminal boards 21—21 approaches the sprocket wheel 68, the board will be engaged by at least one of several of the teeth 71—71 which insures a more positive feeding of the board by the sprocket wheel 68. If the spacing of the cutout portions 23—23 were sufficiently great and the boards 21—21 were fed tangentially in a single plane, each of the boards may not retain engagement with any of the teeth 71—71 on the sprocket wheel 68.

It should be noted from FIG. 4, that the guide tracks 56 and 57 are substantially tangent to the outer periphery of the sprocket wheels 68 and 69, respectively. When a different type of the terminal boards is used for assembly with the terminals 21—21, an operator selects a different sprocket wheel 68 in which the spacing between the adjacent teeth 71—71 is equal to the given distance $d_2$ between the successive cutout portions 23—23 on the boards 21—21. The sprocket wheel 69 need not be changed so long as the distance $d_1$ between the centers of successive terminals 11—11 remains uniform.

If the angular velocities of the two shafts 63 and 67 remain constant and identical, changes in the relative rates of velocity of the boards 21—21 and terminals 11—11 can be accomplished by varying the relative diameters of wheels 61 and 62, or the spacings of the teeth 71 and 72, or a combination of the two. Infinite variations in sprocket wheel sizes are possible. Under these conditions, the number of the teeth 71 and 72 on the two wheels 68 and 69 would remain the same for each selected pair of wheels.

Should it be necessary to change the wheels 68 and 69, the guide tracks 56 and 57, which may be available as a preassembled unit, can be secured rapidly in place or removed as required. In this way, the apparatus 30 may be changed rapidly to accommodate the terminal boards 21—21 of any type having spacing $d_3$ between successive pairs of slots 22—22 which may vary from one type of the board to another.

Furthermore, each of the sprocket wheels 68 and 69 are mounted in an identical manner. Consideraing now only one of the wheels, sprocket wheel 68 is formed with a stepped inner surface 73 (see FIG. 9) and is supported on a complementary mating support ring 74 that is keyed to the shaft 63. A clamp ring 75 is placed on the shaft 63 to abut the support ring 74 and the stepped portion 73 of the sprocket wheel 68. The clamp ring 75 is secured to the support ring 74 by a plurality of studs 76—76 secured in threaded apertures 70—70 in the support ring to clamp the sprocket wheel 68 on the support ring.

Occasionally, it may be necessary to adjust the position of the sprocket wheel 68 with respect to the sprocket wheel 69 in order to position correctly the advancing terminal boards 21—21 and strip 10 relative to each other with respect to the assembly device 40. This may be accomplished by forming the sprocket wheel 68 with a projecting lug 77 which extends transversely from, and is integral with, the sprocket wheel 68 and which is held adjustably between two set screws 78—78. The set screws 78—78 are turned into radially projecting portions of an adjusting collar 79 which is integral with the support ring 74, as shown in FIGS. 8 and 9. The collar 79 is also clamped against the shaft 63 by a stud 80 which extends through the collar 79 on the side of the shaft 63 opposite the lug 77 and may be tightened to press the collar against the shaft.

In order to adjust the wheel 68, for example, with respect to the shaft 63, it is only necessary to turn the set screws 78—78 to move the lug 77 clockwise or counterclockwise, as viewed in FIG. 8, as desired. The movement of the lug 77, which is integral with the sprocket wheel 68 rotates the support ring 74 and the sprocket wheel 68 which is attached thereto. In this way, the sprocket wheel 68 with the teeth 71—71 projecting into the cutout portions 23—23 of the terminal boards 21—21, or the sprocket wheel 69 having teeth 72—72 projecting into the openings in the strip 10 of terminals 11—11, may be rotated relative to the shaft 63 or 67 to advance or retract the point of coincidence of the boards 21—21 or strip 10 with respect to the terminal inserting operation at the assembly device 40.

As shown in FIGS. 4 and 10, the assembly device 40 for terminal inserting and bending includes a fixed shear blade 82 which is positioned in a vertical plane and the longitudinal axis of the blade is parallel to the longitudinal axis of the strip 10 of terminals 11—11 so that the blade 82 is aligned over the solid center portion 12 of the advancing strip (see FIGS. 10 and 11). The strip 10 of terminals 11—11 is advanced over the lower guide track 57 and over an elevating and shearing punch 83 having a keyhole slot 84 (see FIGS. 10 and 11) formed therein. The keyhole slot 84 (FIG. 11) in the shearing punch 83 is aligned with the center portion 12 of the strip 10.

The shearing punch 83, which is biased downwardly by a spring 85, has a bifurcated end 86 which receives a cam follower 87. The cam follower 87 rides along a cam 88 that is mounted on a shaft 89. The shaft 89 extends through a bearing 90 in a supporting frame 91 and has a second cam 92 keyed thereto (see FIGS. 10 and 11). The cam 92 supports a cam follower 93 to which is attached a push rod 94. The push rod 94 extends vertically upward past the level of the guide tracks 56 and 57 and is mounted slidably through brackets 96—96 that extend from the frame 91. The top of the push rod 94 contacts a roller 97 which is mounted rotatably at one end of a rocker arm 98. The top of the support frame 91 forms a fulcrum support for the rocker arm 98.

Figure 14:
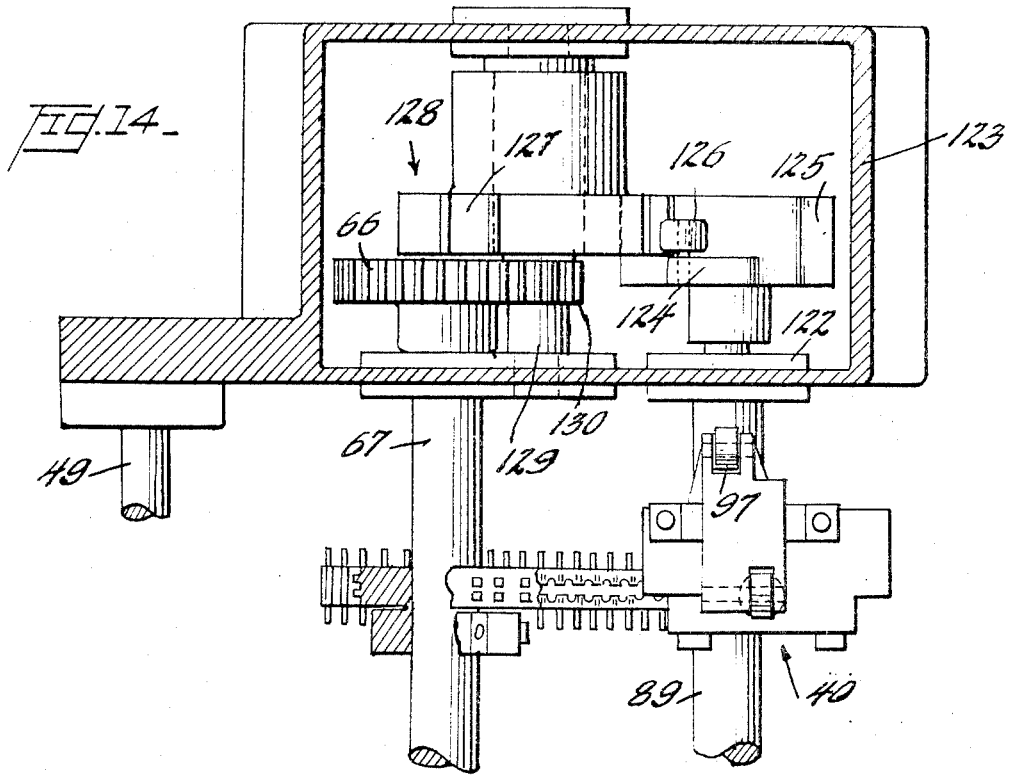
FIG. 14 is a horizontal, sectional view of the gear box and an adjoining pair of feeding devices and work station of the apparatus of FIG. 12, taken along lines 14—14 of FIG. 13.

The other end of the rocker arm 98 has a roller 99 mounted rotatably thereon; however, it should be observed from FIGS. 10 and 14 that the rollers 97 and 99 at opposite ends of the rocker arm 98 are laterally offset from one another. The reason for the offsetting of the rollers 97 and 99 will become readily apparent from the further description of the apparatus.

The roller 99 bears against the top of an adjusting bolt 101 that is turned threadably into the top of a forming and bending punch 102. The forming and bending punch 102 is moved reciprocably in a vertical direction under the action of the rocker arm 98 and extends through an opening 103 in a guide block 104 that is attached to the supporting frame 91. A spring 105 is positioned within an upper stepped portion of the block 104 and is disposed concentrically about the punch 102.

A lower end 106 of the forming punch has a vertical slot 107 formed therein to receive the fixed blade 82. Furthermore, the forming punch 102 on each side of the slot 107 has a first die cavity 108 and a second die cavity 109 and a flattened portion 111 formed on the bottom of the lower end 106 (see FIGS. 10 and 11).

The forming punch 102 is arranged so that the first die cavity 108 is aligned with the elevating and shearing punch 83 which is in the same vertical plane as the push rod 94 and the roller 97. The second roller 99 is aligned over that part of the forming punch 102 having the flattened portion 111 formed along the bottom thereof.

As viewed in FIG. 10, the lower feed track 57 ends immediately to the left of the elevating and shearing punch 83, and a bed 112 of the apparatus is coplanar with the upper feed track 56. The bed 112 begins adjacent to the first die cavity 108. In order to sever the center portion 12 from the strip 10 after the terminals 11—11 have been severed therefrom, a scrap shear blade 113 is attached to one side of the elevating and shearing punch 83, with the top of the scrap shear blade positioned below the top of the elevating and shearing punch (see FIGS. 10 and 11). In order to collect those portions of the center portion 12 of the strip 10 of terminals 11—11 as they are severed from the strip, a scrap chute 114 extends from the bed 112 near the scrap shear blade 113 downwardly to a collecting receptacle (not shown).

Immediately forward of the forming and bending punch 102 is an upper guide block 116 (see FIGS. 10 and 11) under which the assembled terminal strip 20 is fed following a bending operation. In order to keep the forward end of each of the strips 20—20 from backing up in the apparatus 30, a plunger 117 is positioned on each side of the fixed shear blade 82 within an opening 118 formed in the guide block 116 (see FIGS. 10 and 11). As the terminal strip 20 is fed forwardly, the force of the strip 20 against a ball-shaped end 119 of the plunger 117 raises the plunger against the action of a spring 115. The spring 115 biases the plunger 117 which is biased downwardly against the terminal strip 20 to maintain the strip against the bed 112.

In order to drive the forming punch 102 and the elevating and shearing punch 83, a motor 120 (FIG. 12) drives a chain or gear mechanism, designated generally by the numeral 121, connected to the cam shaft 89. As shown in FIG. 12, the cam shaft 89 extends past any number of assembly devices 40 for inserting and crimping through a bearing 122 and into a gear box 123 (see also FIG. 14). A driving link 124 is formed integrally with a disc 125 which is mounted rigidly to the shaft 89. The driving link 124 extends radially from the disc 125 to support rotatably a driving pin 126 (see FIGS. 12, 13 and 14). The driving pin 126 engages in seriatim a plurality of radial slots 127—127 formed in a Geneva mechanism, designated generally by the numeral 128, mounted on a shaft 129. The Geneva mechanism 128 is a well-known device for obtaining intermittent motion from a constant velocity driver and, in this application, the movement of the pin 126 in a slot 127 corresponds with the indexing of the terminal boards 21—21 and strip 10 of terminals 11—11 toward the insertion and bending station to position a pair of leading terminals 11—11 in alignment with slots 22—22 in boards 21—21.

Furthermore, the shaft 129 extends past the Geneva mechanism 128 and has a gear 130 (see FIGS. 13 and 14) attached thereto. The gear 130 meshes with gear 66 to drive the shafts 63 and 67 for the rotary feed device 61 and rotary feed device 62, respectively (see FIG. 13).

As shown in FIGS. 12 and 15, the cam shaft 89 has a third cam 131 keyed thereto. A follower 132 attached to an end of a push rod 133 rides along the cam 131. The push rod 133 is positioned slidably within a housing 134 and has an end 136 (see FIG. 15) which rides on a roller 137. The roller 137 is mounted on a pin 135 which extends through one end of a bell crank lever 138 which is mounted to the shaft 49. The other end of the bell crank lever 138 is keyed to the shaft 49 and is further secured thereto by the clamping action of a set screw 139 extending transversely of a split end of the lever. Any number of oscillatory arms 48 may be mounted on the shaft 49 and simultaneously moved by the rotation of the bell crank lever 138 (see FIG. 7).

In order to maintain the follower 132 in constant contact with the cam 131, a spring 141 is provided. One end of the tension spring 141 is attached to the end of the pin 135 and the other end is attached to the housing 134.

OPERATION

In the operation of the apparatus for inserting terminals 11—11 into terminal boards 21—21 to form a terminal strip 20, an operator adjusts initially the rear guide plate 36 (FIG. 4) of each of the supply magazines 31—31 to receive a particular size terminal board 21 (see FIG. 5). As mentioned hereinbefore, it is within the scope of this invention to use terminal boards 21—21 of different lengths on each side of the center plate 32. This may be done by setting the rear guide plate 36 on one side to accommodate boards 21—21 having a specified length, and setting the rear guide plate 36 on the other side of the magazine to accommodate a different length board 21. The rear guide plate 36 is secured in place after which the operator places a stack 24 of boards 21—21 into the magazine 31 on each side of the center plate 32.

The operator then pulls back on the manual start-up plunger 42 to move the feed pawl 41 under the lowermost terminal board 21, and rearwardly to engage another cut-out portion 23 in the board (see FIGS. 4 and 6). When the plunger 42 is released, the spring 46 exerts a force against the plunger 42 to move the plunger and board 21 forwardly. By repeating this manual operation several times, the original lowermost terminal board 21 is moved past the front guide plate 34 whereupon the next board 21 rests on the feed track 33 and abuts the previous board. Eventually, the original lowermost board 21 is fed into the nappe of the rotary feed device 61 whereupon the cutout portions 23—23 will be engaged by teeth 71—71.

Then the operator pulls a leading end of the strip 10 of terminals 11—11 from the roll 58 of preformed and interconnected terminals 11—11 up over the second feed device 62 and over the teeth 72—72 of the sprocket wheel 69 into the lower guide track 57 (see FIG. 4).

The motor 120 is started up to initiate automatic operation of the apparatus by first turning the shaft 89. The shaft 89 turns the driving link 124 and disc 125 to move a pin into one of the slots 127 in the Geneva mechanism 128 to rotate the Geneva mechanism. The rotation of the Geneva mechanism 128 rotates gear 130 which then rotates gears 64 and 66. The rotation of the gears 64 and 66 turns the shafts 63 and 67, respectively, to index the sprocket wheels 68 and 69. The intermittent rotation of the sprocket wheels 68 and 69 advances a board 21 a distance $d_2$.

Simultaneous with the sprocket wheel 68 advancing the boards 21 a distance $d_2$, the teeth 72—72 in the lower sprocket wheel 69 engage the strip 10 of interconnected terminals 11—11 and advance the strip a distance $d_1$. It should be noted that in the embodiment shown in the drawings and described herein, the distances $d_1$ and $d_4$ will remain constant for a given type board 21, whereas the distances $d_2$ and $d_3$ may vary as between different type terminal boards 21 (see FIG. 2).

After the Geneva mechanism 128 has been rotated through an angle of 90° (FIG. 13), the pin 126 moves out of the slot 127, and the disc 125 locks the Geneva mechanism in a stationary position while the disc and link 124 are rotating. The driving link 124 must rotate counterclockwise through an angle of 270° until the pin 126 engages the next successive radial slot 127. During the rotation of the driving link 124 through the 270° angle, the Geneva mechanism 128 is held stationary by the engagement of the disc 125 with the curved portion of the Geneva wheel between successive radial slots 127—127.

The terminal boards 21—21 and the terminals 11—11 are advanced simultaneously along the upper feed track 56 and the lower feed track 57, respectively, toward the assembly device 40 (see FIGS. 4 and 14). The simultaneous feeding must be accomplished so that, when the leading pair of terminals 11—11 and the leading pair of slots 22—22 of a terminal board 21 reach the center line of the first die cavity 108, the upstanding legs 13—13 of the terminals 11—11 must be coincidental with the receiving slots in the board (see FIG. 10). Should this not be the case, the operator adjusts the position of sprocket wheel 68 or sprocket wheel 69, or both of the sprocket wheels 68 and 69, on the shafts 63 and 67 by adjusting the screws 78—78 in order to bring the upstanding legs 13—13 of the terminals 11—11 on the strip 10 and the slots 22—22 in the board 21 into proper mating relationship at the assembly device 40.

During the time interval when the Geneva mechanism 128 is stationary and the driving link 124 is rotated by shaft 89 through the 270° angle, the rotation of the cam shaft 89 turns the cam 88. The rotation of cam 88 raises the follower 87 to move the elevating and shearing punch 83 upwardly. At this time, the forming punch 102 is raised above the feed track 56.

As the elevating and shearing punch 83 is moved upwardly, the upstanding legs 13—13 of the leading pair of terminals 11—11 enter the slots 22—22 in the board. Then, as the punch 83 is moved further upwardly, the terminals 11—11 are sheared from the continuous portion 12 of the strip 10 along lines a—a (see FIG. 16) by the cooperation of the edges of the keyhole slots 84 with the lower edges of the fixed die blade 82.

As the cam follower 87 rides further along the cam 88, the elevating and shearing punch 83 is raised further to continue to move the upstanding legs 13—13 of the severed pair of terminals 11—11, one on each side of the fixed blade 82, through the slots 22—22 in the terminal board 21—21 until the flat portion of the terminal 11 is in contact with the underside of the board 21.

The scrap shear blade 113, by virtue of the top surface thereof being slightly lower than the top surface of the elevating and shearing punch 83 does not contact the strip 10 when the terminals 11—11 are severed therefrom. However, after the entrance of the legs 13—13 through the slots 22—22 in the board 21, the scrap shear blade 113, having a delayed contact with the center portion 12 of the strip 10, shears the leading and attached portion of the center portion along line b (see FIG. 17) from the remainder of the strip 10. The severed part of the center portion 12 falls into the scrap chute 114 and is conveyed by gravity therealong and into a collection receptacle (not shown).

The continued rotation of the shaft 89 through the remaining degrees of the 270° angle turns the cam 92 to raise the push rod 94 and pivotally move the rocker arm 98 clockwise about the fulcrum. The clockwise movement of the rocker arm 98 forces the roller 99 against the adjusting bolt 101 and overcomes the force of the spring 105 to move the forming and bending punch 102 downwardly against the terminal strip 20. The die cavity 108 is moved down to bend over the upstanding legs 13—13 and because of the shape of the die cavity, the legs 13—13 are bent slightly toward one another.

As the shaft 89 continues to rotate, the follower 87 rides along a smaller diameter portion of the cam 88 thereupon permitting the spring 85 to force the elevating and shearing punch 83 to descend into a lower position in preparation for another cycle of operation. Simultaneously, the cam 92 rotates so that the cam follower 93 descends and the push rod 94 drops. This moves the roller 99 upwardly and permits the spring 105 to raised the forming and bending punch 102 in preparation for another cycle of operation after which the terminal strip 20 will be advanced forwardly.

The rotating of the cam 131 on the shaft 89 moves against the follower 132 to slidably move the rod 133 against the roller 137, pinned to the actuating lever 138, to rotate the lever (see FIG. 15). The rotation of the actuating lever 138 rotates shaft 49 which oscillates arm 48 against the plunger 42 to retract the pawl 41 down and back under the terminal boards 21 until the pawl engages another opening in the boards (see FIGS. 4 and 6). As the follower 132 moves along a smaller diameter portion of the cam 131, the tension spring 141 pulls the actuating lever clockwise as viewed in FIG. 15. This rotates the actuating lever 138 and hence the shaft 49 clockwise whereupon the force exerted by the arm 48 against the plunger 42 is released. The spring biased plunger 42 then moves forwardly to move the pawl and push the boards 21 toward the rotary feed devices 61 and 62.

By this time, the driving link 124 has completed rotation through the angle of 270° and the pin 126 engages another slot 127 to turn the Geneva mechanism 128 and index the rotary feed devices 61 and 62 through another cycle. Since the punch 102 has been raised off the feed track 56, the terminal board 21 with legs 13—13 of the terminal 11 protruding therethrough may be advanced intermittently under the punch.

When the boards 21 have been indexed intermittently by the rotary feed devices 61 and 62, the partially bent terminals 11—11 are now aligned with the second die cavity 109 and the downward movement of the forming and bending punch 102 further bends the terminals because of the shallower slope of the side walls of the cavity (see FIG. 10). The cam 92 rotates, the push rod 94 drops, and the rocker arm 98 moves counterclockwise, as viewed in FIG. 11, to release the punch 102 for upward movement under the action of the spring 105.

Then the terminal strip 20 is indexed until a next pair of terminals 11—11 is aligned with the first die cavity 108 and the upstanding legs 13—13 of another pair of terminals are aligned for insertion into slots 22—22 in the board 21. The previously, partially bent terminals 11—11 are then under the flat portion 111 of the punch 102 whereupon the punch is again cycled and descends to completely bend the upstanding legs 13—13 of the terminals 11—11 over and into engagement with the terminal board 21.

Simultaneous with the bending of the leading terminals 11—11 under the flat portion 111 of the punch 102, the next succeeding pair of terminals are being further bent in the die cavity 109, and the next succeeding pair of terminals are being severed from the strip 10 and the upstanding legs 13—13 pushed through the slots 22—22 in the board 21 into the die cavity 108 (see FIG. 10). Subsequently, the leading end of the assembled terminal strip 20 is pushed against the ball-shaped end 119 of the spring-loaded plunger 117 to slightly raise the plunger to permit the strip 20 to pass thereunder. The spring-loaded plunger 117 bears against the terminal strip 20 to maintain the strip against the bed 112.

It should be realized that instead of a supply stack of individual terminal boards 21 placed in the supply magazine 31, a continuous supply roll of flexible board material could be used and an appropriate shearing apparatus could be employed to periodically sever a particular size assembled terminal strip 20 from the supply. Furthermore, it is within the scope of this invention to employ a programmed shearing apparatus forward of the inserting and bending station to sever, selectively, predetermined length strips from a continuous assembled strip of terminals. Moreover, a continuous length of terminal board material could be supplied whereupon the terminals 21—21 are assembled thereto to form a continuous length of terminal strip.

In addition, the invention described herein may be used to associate congruently a plurality of first articles having a space $d_1$ therebetween with a plurality of second articles having a space $d_2$ therebetween where $d_2$ may be less than, equal to, or more than $d_1$. Moreover, the invention described herein could be used where the distance $d_2$ between successive cutout portions 23—23 on the terminal boards 21—21 remains constant and the distance $d_1$ between the centers of successive pairs of opposing terminals changes.

It would be well within the scope of the invention to use feed members having a plurality of spaced magnets or other article engaging means formed around the periphery thereof. Operations other than the inserting and bending could be envisioned to be performed at a station subsequent to the feeding apparatus per se in order to unite the first and second articles.

It is to be understood that the above-described arrangements are simply illustrative of the invention. Other arrangements may be devised by those skilled in the art which will embody the principles of the invention and fall within the spirit and scope thereof.

What is claimed is:

1. A method of aligning successive ones of a series of first members having an initial predetermined spaced relationship with predetermined spaced positions on a second member which includes the step of:
   advancing said first members and said second member while selectively imparting relative longitudinal movement to each other at a ratio which is proportional to the ratio of the initial distance between said first members and the distance between said spaced positions, to move said first members seriatim into alignment with said spaced positions on said second member.

2. A method as set forth in claim 1 including the additional step of:
   securing each leading member advanced into alignment with each of said spaced positions to said second member.

3. A method of securing terminals at predetermined distances along a board wherein the terminals are initially connected in a strip and each terminal has a pair of securing legs, the initial spacing between adjacent terminals being different than said predetermined distance, said board having successive pairs of terminal receiving slots that are spaced apart at said predetermined distances, which comprises:
   advancing said board at a first velocity;
   advancing said strip at a second velocity in a ratio to said first velocity which is proportional to the ratio of the distance between said pairs of slots and the initial spacing between adjacent terminals to move said pairs of terminal legs into alignment with said pairs of slots;
   moving said aligned securing legs into said slots; and severing successive terminals from the strip as each pair of legs moves into each pair of slots.

4. A method of assembling successive leading ones of a series of first members initially interconnected in a strip to a second member at predetermined spaced positions wherein the initial spacing between said first members is different than the spacing of said predetermined spaced positions;
   advancing said first members and said second member while imparting relative longitudinal movement to each other at a ratio which is proportional to the ratio of the initial spacing between said first members and the spacing of said positions to move said first members seriatim into alignment with said spaced positions on said second member;
   severing each successive leading ones of said first members from said strip as the leading one of said first members is moved into alignment with said spaced positions; and
   assembling each of the severed first members with said second member at separate ones of said spaced positions of said second member.

5. In an apparatus for aligning successive ones of a series of first members having an initial predetermined spaced relationship with predetermined spaced positions on a second member;
   selectively changeable means for engaging and advancing said first members and for engaging and advancing said second member to impart relative longitudinal movement to each other at a ratio which is proportional to the ratio of the initial distance between said first members and the distance between said spaced positions; and
   means for driving said first member advancing means and said second member advancing means to align successive first members with successive spaced positions on said second member.

6. In an apparatus for aligning a plurality of serially advanced articles, having an initial space therebetween, with predetermined second spaced positions on a support member, the distance between second spaced positions on said support member being different from the initial spacing of the serially advanced articles;
   a first rotary means having feed members movable in a first circular path for indexing said articles;
   a second rotary means having feed members movable in a second circular path for indexing successive portions of said support member, said second rotary member having an axis of rotation parallel to, and spaced from, an axis of rotation of said first rotary member, said first and second rotary feed members movable in circular paths having a ratio of diameters equivalent to the ratio of said initial and second spaces; and
   means for driving said rotary feed members at equal angular velocities so that successive articles are aligned with successive positions on said support member.

7. In an apparatus for assembling first members secured together and spaced a predetermined distance apart, onto a second member with a second spacing between the assembled first members;
   means for advancing successively said first members to an assembly position;
   means for advancing successive portions of said second member to the assembly position at a rate relative to said first member which is proportional to the ratio of the predetermined distance between said first members to the second spacing; and
   means at the assembly position for severing each of said successive first members advanced to the assembly position and for assembling each of said severed first member onto said second member.

8. An apparatus for severing terminals from an indefinite length supply of interconnected terminals having a first space between adjacent terminals and inserting said terminals into slots in a strip of electrical insulating material, said inserted terminals having a second space therebetween, comprising:
   a pair of feed wheels having parallel axes of rotation, said wheels spaced apart to receive the terminals and insulating strip therebetween, with the ratio of diameters of said wheels equal to the ratio of said first space to said second space;
   means for severing said terminals from said supply and for inserting said terminals into said slots in said strip; and means actuated in timed relation with said severing and inserting means for rotating said wheels in unison and at the same angular velocity to advance said strip and said terminals to said severing and inserting means.

9. An apparatus for severing terminals from an indefinite length supply of interconnected terminals having a first space between adjacent terminals and inserting said terminals into slots in a strip of electrical insulating material, said inserted terminals having a second space therebetween as described in claim 8, wherein:

said means for severing and inserting said terminals in said strip comprises a reciprocably mounted punch and a reciprocably mounted die.

10. An apparatus for severing terminals from an indefinite length supply of interconnected terminals having a first space between adjacent terminals and inserting said terminals into slots in a strip of electrical insulating material, said inserted terminals having a second space therebetween as described in claim 9, wherein:

said reciprocably mounted die has a succession of cavities formed therein adjacent to said punch for receiving legs depending from said terminals, with each of said cavities being shallower than each preceding cavity, whereupon the legs depending from the terminals are sequentially bent against said strip of electrical insulating material.

11. In an apparatus for assembling first members connected together and spaced initially a predetermined distance apart, onto a second member with a second spacing between the assembled first members;

means for advancing intermittently said first members to an assembly position at a first predetermined rate;

means for advancing intermittently said second member to said assembly position at a second predetermined rate, the ratio of said first rate to said second rate being proportional to the ratio of said predetermined distance between said first members and the second spacing; and means at the assembly position rendered effective between each intermittent advance of said first members and said second member for severing each successive individual first members advanced to said assembly position and for assembling each severed first member onto said second member.

12. In an apparatus for aligning a plurality of interconnected, spaced articles with an apertured support member at a predetermined distance therebetween;

a first circular rotary feed member having a first diameter, said rotary member mounted for rotation about an axis of rotation;

a second circular rotary feed member having a second diameter, said second rotary member mounted for rotation about an axis parallel to the axis of rotation of said first rotary member, said axes of rotation spaced apart to allow the articles and the support members to pass therebetween; and the ratio of said first and second diameters being proportional to the ratio of the space between said interconnected articles and said predetermined distance.

13. In an apparatus for aligning a plurality of interconnected, spaced articles with an apertured support member at a predetermined distance therebetween, as set forth in claim 12, comprising in addition thereto:

means mounted on said first rotary member for engaging said plurality of interconnected articles in seriatim to advance said articles to a subsequent work station; and means mounted on said second rotary member for engaging said support member to advance said support member to said work station.

14. In an apparatus for aligning a plurality of interconnected, spaced articles with an apertured support member at a predetermined distance therebetween, as set forth in claim 13 wherein:

said means mounted on said first and second rotary members may be rotated adjustably with respect to each other to insure proper alignment of said articles and said support member at said work station.

15. In an apparatus for associating a plurality of interconnected, spaced articles with an apertured support member at a predetermined distance therebetween, as defined in claim 12, which also includes:

an oscillating arm;

a reciprocating carriage engaging said arm;

a pivotable feed pawl mounted on the reciprocating carriage, said pawl being biased upwardly to engage the apertures in said support member;

a spring-biased plunger in contact to said carriage;

means for moving said arm in a first direction against the biasing action of said spring-biased plunger to move the carriage, to oscillate said pawl out of registration with one of the apertures in said support member, and carry the pawl under said support member until said pawl becomes engaged with the succeeding aperture in said support member, and subsequently to move said arm in the opposite direction to permit the spring-biased plunger to push the carriage, said pawl and said support members toward said rotary feed members; and means actuated in timed relation to said oscillating means for rotating intermittently said first and second feed members to index said interconnected articles and said support member.

16. In an apparatus for assembling tabs projecting from terminals in a carrier strip into slots formed in a board;

a first die means having inserting and shearing sections;

a forming die means spaced from an aligned with said inserting and shearing die means;

means for simultaneously advancing said carrier strip and board past said forming die means and said inserting die means at different rates of speed to position said tabs of successive terminals in alignment with associated ones of said slots in said board;

means rendered effective in synchronism with the operation of said advancing means for moving said inserting and shearing die to life said carrier strip to cause said tabs to project from successive terminals through said associated aligned slots;

means rendered effective during movement of said inserting and shearing die for moving said forming die against said tabs; and a stationary die positioned in the path of movement of said shearing section for severing said carrier strip from said terminals and tabs.

17. In an apparatus for moving a series of first members having an initial spacing and deformable securing elements projecting therefrom into individual alignment with predetermined spaced positions on a second member where the initial spacing between the first members is different from the spacing of said spaced positions on said second member;

means for engaging and advancing said second member;

means for engaging seriatim and for advancing said first members in unison to move successive leading ones of said first members into alignment with successive associated ones of said predetermined spaced positions of said second member;

means for driving said first and second engaging and advancing means at relative rates wherein the ratio of the rates is proportional to the ratio of the initial spacing of said first members to the spacing between said positions; and means operable upon each of the leading ones of said first members being advanced into alignment with said predetermined spaced positions on said second member for deforming each securing element to secure one of said first members to said second member at each of said spaced positions.

18. In an apparatus for inserting each of a plurality of interconnected terminals, having a first space therebetween, said terminals further having depending legs which are to be positioned into a plurality of pairs of slots formed in and spaced along a terminal board at a second space;
- a first rotary feed member having a plurality of spaced, radially projecting teeth formed on the outer periphery thereof to engage the interconnected terminals;
- a second rotary feed member having a plurality of spaced, radially projecting teeth formed on the outer periphery thereof to engage the slots in the terminal board, with the ratio of the radial distance from the axis of said first member to the points of engagement of the associated radial projecting teeth with the terminals to the radial distance from the axis of rotation of said second member to the points of engagement of associated radial projecting teeth with the slots in the terminal board being equal to the ratio of said first space between said interconnected articles to the second space between said pairs of slots on said strip, said second member having its axis of rotation parallel to the axis of rotation of said first member;
- said first and second rotary feed members spaced apart to receive said interconnected terminals and said terminal board therebetween;
- means for severing said terminals from one another and for inserting the legs of said terminal through said slots in said terminal board;
- means positioned between said rotary feed members and said severing means for receiving said terminals and said terminal board and for guiding said board and said terminals while maintaining a space therebetween;
- means actuated in timed relation with said inserting means for bending sequentially the legs of successive ones of the terminals previously inserted into said board against said board; and
- means responsive to said severing and inserting means for rotating said first and second feed members to position the successive terminals in alignment with the successive pair of slots in a terminal board and to index each of said inserted terminals adjacent to said severing means and adjacent to said bending means.

19. A method of assembling successive ones of a series of first members having an initial predetermined spaced relationship with predetermined spaced positions on a second member which includes the steps of:

advancing said first members and said second member while selectively imparting relative movement thereto at a ratio which is proportional to the ratio of the initial distance between said first members and the distance between said spaced positions, to move said first members seriating into alignment with said spaced positions on said second member; and assembling each leading first member advanced into alignment with each of said spaced positions to said second member.

20. A method of assembling successive ones of a series of first members to a second member as set forth in claim 19 wherein:
said first members are interconnected with said predetermined spaced relationship therebetween and including the further step of:
severing successive leading ones of said first members from said interconnected first members.

21. In an apparatus for aligning successive ones of a series of first members having an initial predetermined spaced relationship with predetermined spaced positions on a second member;
selectively changeable means for engaging and advancing said first members and for engaging and advancing said second member while imparting relative movement thereto at a ratio which is proportional to the ratio of the initial distance between said first members and the distance between said spaced positions;
means for driving said first member advancing means and said second member advancing means to align successive first members with successive spaced positions on said second member; and
means rendered effective by the alignment of successive ones of said first members with said second member at said second spacing for assembling said successive ones of said first members with said second member.

References Cited

UNITED STATES PATENTS

| 1,160,791 | 11/1915 | Van Houten | 198—34 |
| 2,638,147 | 5/1953 | Nebel | 156—553 |
| 2,726,394 | 12/1955 | Lowell. | |
| 2,958,365 | 11/1960 | Molins et al. | 156—519 |
| 3,044,251 | 7/1962 | Stamps et al. | 57—157 |
| 3,302,278 | 7/1967 | Whitney. | |
| 3,382,646 | 5/1968 | Leudtke et al. | |

THOMAS H. EAGER, Primary Examiner

U.S. Cl. X.R.

29—203, 211; 156—553; 198—34